Patented May 11, 1943

2,318,895

UNITED STATES PATENT OFFICE 2,318,895

BIOLOGICALLY ACTIVE PRODUCT FOR CONTROLLING PROCREATIVE METABOLISM

Lee Irvin Smith, Minneapolis, Minn., assignor to Regents of the University of Minnesota, Minneapolis, Minn., a corporation of Minnesota No Drawing. Application July 14, 1939,
Serial No. 284,454

4 Claims. (Cl. 167—81)

The present invention relates to an improved dietary and medicinal composition for the control of biometabolism, and more particularly, to compositions and mixtures exhibiting the biological effects of naturally occurring substances known as the tocopherols.

According to the work of Evans, Emerson and Emerson, Journal of Biological Chemistry, vol. 113, page 321 (1936) when certain naturally occurring substances are included in the diet, the procreative metabolism of the individual is rendered normal, whereas when the diet does not include these factors the procreative function is inhibited. Thus when properly conditioned female test animals are fed a diet which does not include certain naturally occurring substances, the reproduction is inhibited or completely nullified, whereas when the same animals are returned to a diet including the proper naturally occurring substances, normal reproduction is resumed.

Accumulated evidence has indicated that the ordinary diets of many animals and humans are deficient in naturally occurring biological control factors, and has indicated the necessity of including diet supplement or corrective factors to offset such deficiencies. It has therefore been customary to utilize extracts or fractions of naturally occurring substances for such additive diet correction factors in the diets of humans and animals.

The use of naturally occurring compounds for diet corrective purposes has been restricted due to the cost of the natural substances, the difficulty encountered in concentrating the active factors without deteriorating them, instability of the concentrates for use due to rapid oxidation when exposed to air, and many similar difficulties. As a consequence, the use of naturally occurring substances has been restricted.

According to the present invention, dietary control and correction may be accomplished readily and with certainty by the use of coumaron compounds specifically 2,4,6,7-tetramethyl-5-hydroxy coumaron, or its esters such as the acetate, propionate, palmitate and the like, and it is therefore an object of the present invention to provide a dietary control factor comprising a coumaron compound.

More particularly, it is an object of the invention to provide a dietary control factor or medicinal agent comprising 2,4,6,7-tetramethyl-5 hydroxy coumaron, or its esters such as the acetate, propionate, palmitate, and the like.

It is also an object of the invention to provide a foodstuff or medicinal agent including a coumaron, particularly 2,4,6,7-tetramethyl-5 hydroxy coumaron, or its esters such as the acetate, propionate, palmitate, and the like.

According to the present invention, biological control is accomplished by adding to the diet of the individual a regulated dosage of a coumaron, preferably 2,4,6,7-tetramethyl-5 hydroxy coumaron and its esters having the following structural formula:

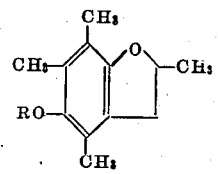

in which R is hydrogen or any acyl group.

The biological effectiveness of 2,4,6,7-tetramethyl-5 hydroxy coumaron for influencing biometabolism is illustrated by the actions upon test animals. Thus when 2,4,6,7-tetramethyl-5 hydroxy coumaron was fed in 100 mg. doses to standardized conditioned female test rats, litters of live young were produced thus demonstrating that the coumaron compound has the same biological control effect of natural vitamin E. The vitamin E activity of this coumaron compound is less than that of alpha tocopherol derived from natural sources, but being relatively non-toxic, the lesser activity is compensatable by increased dosage. Furthermore, the coumaron compound, being perfectly stable in air, retains its effectiveness over long periods of time, and is therefore especially desirable for use.

The coumaron compound 2,4,6,7-tetramethyl-5 hydroxy coumaron is a crystalline solid and for controlling biometabolism is added to the ordinary diet, or taken separately as a medicament. Thus cereal foodstuffs such as granulated grain mixed feeds or dry mash type cattle and poultry feeds may be fortified by the addition of a small proportion of the coumaron compound 2,4,6,7-tetramethyl-5 hydroxy coumaron, or one of the aforementioned esters, which is dry mixed into the cereal foodstuff. This is preferably accomplished by first thoroughly dry mixing about one part of the coumaron compound with five parts of cereal to form a dry concentrate, and then adding and mixing the concentrate with the main body of cereal foodstuff.

Where the diet corrective function may best be carried out by administration of concentrates, it is preferable to form the coumaron compound into tablets or enclose it in suitable capsules.

In either the tablet or capsule form, the compound may be used as such, or bulk may be achieved by the admixture of a neutral solid such as sodium chloride, calcium carbonate, sugar, lactose, starch, or the like, prior to formation into tablet or capsule form.

In some instances, it is desirable to use a fluid concentrate for addition to foodstuffs such as cereal feeds or for direct administration in fluid form. For such modes of utilization the coumaron compound may be carried by a neutral oil such as olive oil, edible mineral oil, butter oil and other similar edible fats and oils.

It is obvious that many variations may be made in the illustrated procedures without departing from the spirit of the invention herein described and claimed.

What is claimed is:

1. A composition for alleviation of conditions resulting from deficiency of vitamin E comprising a compound selected from the group consisting of 2,4,6,7-tetramethyl-5-hydroxy-coumaron and the fatty acid esters thereof.

2. A composition for alleviation of conditions resulting from deficiency of vitamin E comprising 2,4,6,7-tetramethyl-5-hydroxy-coumaron.

3. A composition for alleviation of conditions resulting from a deficiency of vitamin E comprising fatty acid esters of 2,4,6,7-tetramethyl-5-hydroxy-coumaron.

4. A composition for controlling procreative metabolism comprising a compound selected from the group consisting of 2,4,6,7-tetramethyl-5-hydroxy-coumaron, and the fatty acid esters thereof admixed with an edible diluent.

LEE IRVIN SMITH.